United States Patent [19]
Stough et al.

[11] Patent Number: 5,891,282
[45] Date of Patent: Apr. 6, 1999

[54] METHOD FOR TAPING A WALL BOARD JOINT

[75] Inventors: Ronald A. Stough, Hinsdale, Mont.; Edward A. Thompson, De Pere; Gary L. Kozloski, Green Bay, both of Wis.

[73] Assignee: E-Z Taping System, Inc., Green Bay, Wis.

[21] Appl. No.: 915,385

[22] Filed: Aug. 20, 1997

Related U.S. Application Data

[63] Continuation-in-part of Ser. No. 677,382, Jul. 5, 1996, Pat. No. 5,711,124, which is a continuation-in-part of Ser. No. 513,386, Aug. 10, 1995, Pat. No. 5,687,523, which is a continuation-in-part of Ser. No. 297,320, Aug. 26, 1994, Pat. No. 5,486,394.

[51] Int. Cl.$^6$ ........................................................ E04B 2/00
[52] U.S. Cl. ................................................ 156/71; 52/417
[58] Field of Search ........................... 156/71, 94; 52/417

[56] References Cited

U.S. PATENT DOCUMENTS

| | | | |
|---|---|---|---|
| 3,300,330 | 1/1967 | Vassel et al. | |
| 4,042,739 | 8/1977 | Emal | 428/137 |
| 4,263,677 | 4/1981 | Menser | 2/158 |
| 4,399,170 | 8/1983 | Janssen | 156/71 |
| 4,522,004 | 6/1985 | Evans et al. | 52/409 |
| 4,792,473 | 12/1988 | Vitale | 428/40 |
| 5,242,725 | 9/1993 | Weissmann et al. | 428/40 |
| 5,246,775 | 9/1993 | Loscuito | 428/343 |
| 5,486,394 | 1/1996 | Stough | 428/61 |
| 5,687,253 | 11/1997 | Stough | 52/417 |
| 5,711,124 | 1/1998 | Stough | 52/417 |

FOREIGN PATENT DOCUMENTS 2305919  11/1976  France.

*Primary Examiner*—Daniel Stemmer
*Attorney, Agent, or Firm*—Lathrop & Clark LLP

[57] ABSTRACT

The joint between two drywall panels is taped with a paper tape which is backed with a pressure sensitive adhesive. After burnishing the applied tape with a metal or other stiff blade, a water-soaked sponge is moved along the burnished tape to soak the outwardly facing paper surface. The drywall mud is then applied to the wetted paper tape to bridge the joint between the panels without raised or protruding portions of the paper tape, thereby presenting a more continuous and aesthetically satisfying bridge between the panels.

7 Claims, 1 Drawing Sheet

METHOD FOR TAPING A WALL BOARD JOINT

RELATED APPLICATIONS

This application is a continuation-in-part of application Ser. No. 08/677,382, filed Jul. 5, 1996, now U.S. Pat. No. 5,711,124, which is a continuation-in-part of application Ser. No. 08/513,386, filed Aug. 10, 1995, now U.S. Pat. No. 5,687,523, which is a continuation-in-part of application Ser. No. 08/297,320, filed Aug. 26, 1994, now U.S. Pat. No. 5,486,394.

FIELD OF THE INVENTION

The present invention relates to methods for bridging the joint between wall board panels in general, and to methods for applying pressure sensitive tape to wall board joints in particular.

BACKGROUND OF THE INVENTION

In modern commercial and residential construction interior wall surfaces are typically formed from flat modular units affixed to wood or metal studs. These units, know as sheet rock, gypsum board, plasterboard or generically herein as wallboard, come in standard dimensions which are abutted to form a continuous surface. In order to present a surface which is unmarked by seams, it is necessary to position bridging tape which overlaps the seam and which supports a coating of a wet plaster-like compound known as mud. The mud is applied to obscure any variations in the wall profile, and to form the wall surface into an uninterrupted expanse.

Conventional drywall tape is typically a simple kraft paper strip which is adhered to the drywall surfaces by a coating of mud. Because the mud must be applied as the tape is positioned, operators must take care not to discharge the mud onto non-work surfaces. In addition, once the drywall tape has been applied an installer must wait as much as a day for the mud to dry before a final surface coat of mud can be applied.

Self-adhesive drywall tapes eliminate the clean-up and drying time delays associated with other paper tapes. The tapes are adhered to the wall board with light pressure, and are then rubbed down or burnished with a knife and may be immediately coated with mud. These tapes, such as the type manufactured by E-Z Taping System, Inc., of Green Bay, Wis., and disclosed in pending U.S. application No. Ser. 08/677,382, now U.S. Pat. No. 5,711,129, offer rapid and neat application, and can cut many hours in the taping of a building project. Nonetheless, pressure-sensitive adhesive tapes have manifested a tendency to "raise up" or protrude after the initial coating of mud. The raised areas are readily eliminated by waiting for the joint compound or mud to dry and then applying hand pressure to the raised area, or lightly sanding or scraping the raised area. Alternatively, raised up sections may be treated while the mud is still wet by applying pressure to the raised portions. Although the unevenness is completely addressed by these steps, this obstinate phenomenon has been an obstacle to full realization of the time and labor saving benefits of pressure-sensitive tapes for bridging wall board joints.

What is needed is a method for apply pressure-sensitive adhesive backed paper tape to wall board joints which is convenient, consistent, and which does not require waiting for mud to dry.

SUMMARY OF THE INVENTION

By wetting the pressure-sensitive adhesive paper tape after it has been burnished onto the joint between two wall board panels, and then applying the mud coat to the wetted tape, the tendency of portions of the paper tape to raise up is substantially into entirely eliminated. The wetting may be accomplished with a conventional soaked kitchen sponge or the like, and the resultant taped seam is advantageously consistent and economical to apply.

It is an object of the present invention to provide a method for taping seams between wall board panels which may be coated with joint compound or mud immediately after application.

It is another object of the present invention to provide a method for taping seams between wall board panels which yields consistent non-protruding seams.

It is also an object of the present invention to provide a method for taping seams between wall board panels which may be rapidly employed with readily available tools.

Further objects, features and advantages of the invention will be apparent from the following detailed description when taken in conjunction with the accompanying drawings.

DESCRIPTION OF THE PREFERRED EMBODIMENT

Figure 1:
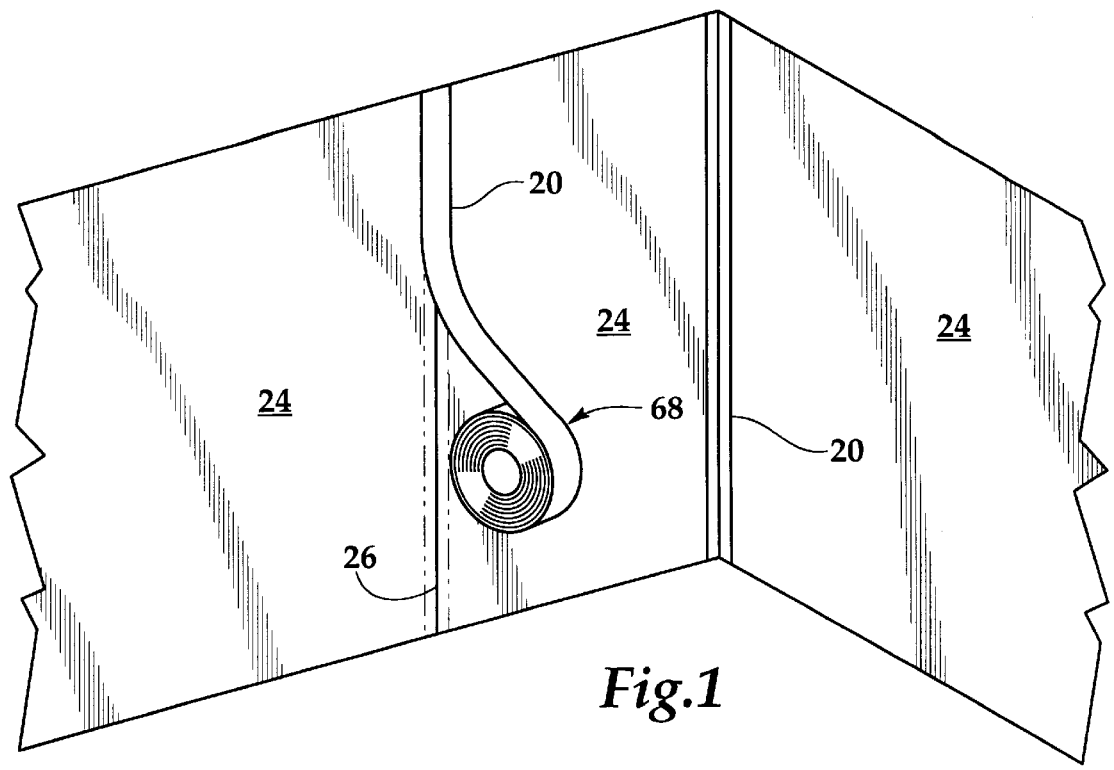
FIG. 1 is a pictorial view representing a pressure-sensitive tape being applied to a seam between adjacent sheets of drywall material in the process of this invention.
Figure 2:
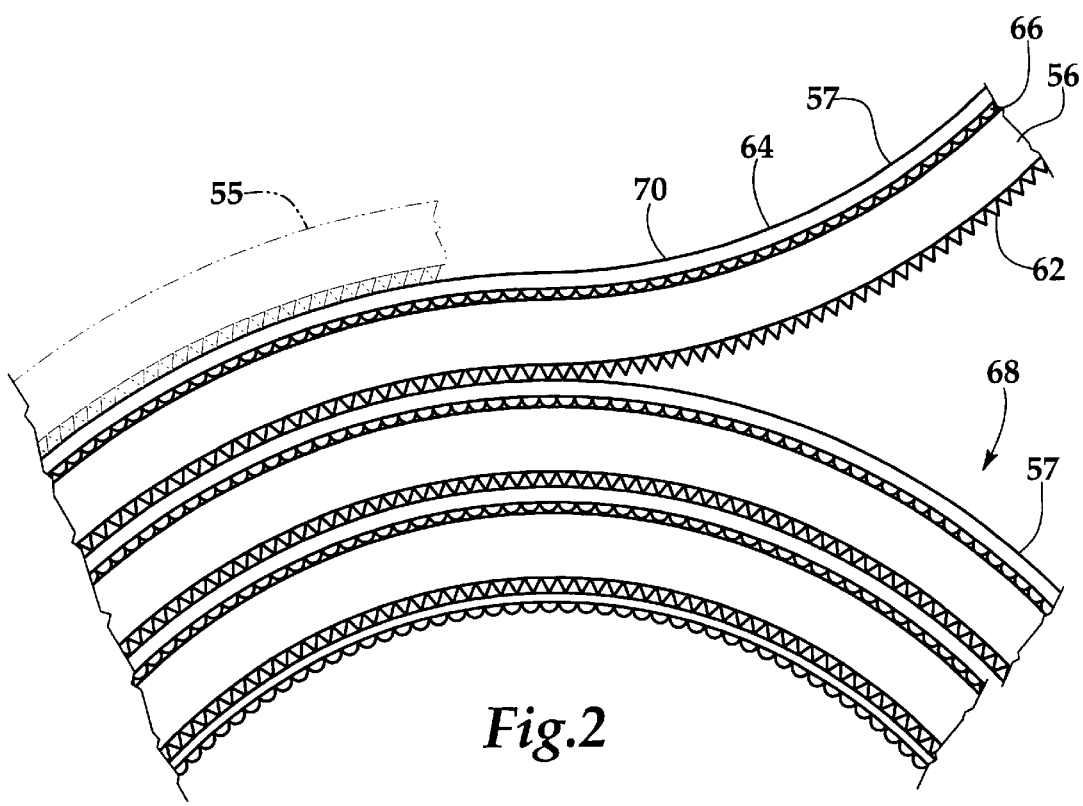
FIG. 2 is a schematic view of a pressure-sensitive tape wound into a roll, with a portion of the paper base layer unwound from the roll.

Referring more particularly to FIGS. 1–2, wherein like numbers refer to similar parts, conventional wall board panels 24, as shown in FIG. 1, are affixed to the vertical studs in an interior building construction. To facilitate manipulation and transportation of the wall board panels, they are typically manufactured in sizes which are less than the surface area of the entire wall. When two panels 24 are abutted against one another a joint 26 is formed. This joint presents a surface level variation or crack which must be covered or bridged prior to the application of paint or other wall covering to present a smooth, uninterrupted wall surface.

An example of a pressure-sensitive adhesive backed paper tape is the tape manufactured by E-Z Taping System, Inc., of Green Bay, Wis., and disclosed in U.S. patent application Ser. No. 08/677,382, now U.S. Pat. No. 5,711,124, the disclosure of which is incorporated by reference herein. Such a tape 20 is available in rolls 68 of a tape assembly which includes the tape 20 itself together with a transfer liner 57. The tape assembly has an untreated paper outer surface 55. The tape 20 has a paper base layer 56, shown in FIG. 2, which may be identical to the conventional paper non-adhesive drywall tape such as is available from International Paper Company of New York. This paper base layer 56 may be an 85 lb. basis weight paper having an outer surface 55 which is untreated and absorptive and hence receptive to the mud coating which will be applied over the tape. The paper may have either a sanded or unsanded finish.

The inner surface of the base layer is coated with a layer of high tack adhesive 62, for example an aqueous acrylic adhesive such as 15–20 pounds per 3000 square feet Green Bay Packaging #540 adhesive, available from Green Bay Packaging, of Green Bay, Wis. For improved adhesion and reduced migration of the adhesive into the base layer, a clay coating may be applied to the base layer 56 prior to application of the high-tack adhesive. Because the absorptive untreated surface 55 of the base layer would adhere in a somewhat permanent fashion to the high-tack adhesive layer 62 of an overlying length of tape 20 if placed in direct engagement, a means for keeping the two surfaces separate is provided. The transfer liner 57 is a lighter weight paper, for example a 20–60 pound layflat liner, which is provided on one face with a release surface 64 which may be formed by an application of silicone. The release surface will engage with the high-tack adhesive of the base layer 56, but is easily releasable from the high-tack adhesive, requiring a peel strength of, for example, 10–15 grams per inch. The other face of the transfer liner 57 is coated with a low tack removable adhesive layer 66. The removable adhesive is similar to the type employed with removable sticky note pads. An exemplary adhesive is Morstik® 240 adhesive, available from Morton International, Inc., of Chicago, Ill. Another suitable adhesive is AROSET® APS-1250 water-based pressure sensitive adhesive, available from Ashland Chemical Co. Division of Ashland Inc., of Columbus, Ohio. Other removable adhesives may also be used. The low-tack adhesive is such that when adhered to the outer surface 55 of the base layer 56 and removed, the receptivity of the base layer 56 to mud or plaster will not be substantially impaired. The removable adhesive layer is designed to adhere to the outer surface of the paper base layer when the tape assembly is wound into a roll 68.

The tape 20 and transfer liner are dispensed from the roll 68 directly onto the joint to be taped. Various roll tape dispensers may be employed. The applied tape assembly may consist of a length of tape 20 attached to the wall and a transfer liner 57 connected by the removable adhesive layer to the outer surface 55 of the tape. Alternatively, the transfer liner may be removed as the tape is applied to the joint. In any event, the transfer liner is removed to expose the outer surface 55 of the paper layer. Generally, the tape is dispensed from the roll with relatively light pressure to the joint. Once applied and in place on the joint, pressure is applied by running a drywall knife, burnishing implement, or other stiff object along the tape to press the tape down onto the wall board panels. Because the removable adhesive leaves little residue on the outer surface 55 of the paper base layer 56, the receptability of the paper to mud is substantially unimpaired.

Next a sponge is soaked in water, either hot or cold, until the sponge is heavily filled with water. The sponge serves as a water carrier from transporting water from a bucket or other reservoir to the surface 55 of the tape 20. Pressure is applied to the soaked sponge as it is moved along the burnished tape 20. The joint is wiped down with the wet sponge, to wet the paper surface 55 of the tape. The sponge is preferably very wet, not simply moist or damp, and in like measure, the paper tape is more than just dampened but is preferably soaked. Next, mud or joint compound is applied to the wetted paper surface in a conventional fashion. By first having been wetted, raising up of the paper tape after being coated with mud is substantially if not entirely eliminated, and will thus present a satisfactory surface for later painting or covering. The mud may be applied to the wetted paper tape while it is still damp, or the mud may be applied to the wetted paper tape after it has dried.

It should be noted that although a particular pressure-sensitive adhesive backed paper drywall tape has been discussed above for use with the method of this invention, other types of paper tape with pressure-sensitive adhesives may also benefit from this application method.

Although a sponge has been discussed above as the water carrier for wetting the tape once it is on the wall, other carriers such as rags, kitchen mops or such may be used.

It is understood that the invention is not limited to the particular construction and arrangement of parts herein illustrated and described, but embraces such modified forms thereof as come within the scope of the following claims.

We claim:

1. A method for applying pressure-sensitive adhesive paper tape to bridge a joint between two adjacent wall board panels, comprising the steps of:

applying a strip of pressure-sensitive adhesive paper tape over a joint between two adjacent wall board panels such that a paper surface faces outwardly;

moving a member along the applied strip to secure the pressure-sensitive adhesive to the wall board panels;

bringing a water-soaked carrier into contact with the tape and moving the carrier along the outwardly facing paper surface to wet the paper surface; and applying mud to the wetted paper surface.

2. The method of claim 1 wherein the step of applying mud to the wetted paper surface is performed immediately after the step of bringing the water-soaked carrier into contact with the tape, to thereby apply mud to a wet paper surface.

3. The method of claim 1 wherein the step of applying mud to the wetted paper surface is performed after the wetted paper has dried.

4. A method for applying pressure-sensitive adhesive paper tape to bridge a joint between two adjacent wall board panels, comprising the steps of:

applying a strip of pressure-sensitive adhesive backed paper tape over a joint between two adjacent wall board panels such that a paper surface faces outwardly;

applying pressure to the applied strip of paper tape to secure said strip to the adjacent wall board panels;

soaking a sponge with water and pressing the soaked sponge against the applied strip of paper tape, moving the sponge along the length of the paper tape strip; and coating the wetted paper surface of the strip of tape with mud.

5. The method of claim 4 wherein the step of coating the wetted paper surface with mud is performed immediately after the step of pressing the soaked sponge against the applied tape, to thereby apply mud to a wet paper surface.

6. The method of claim 4 wherein the step of coating the wetted paper surface with mud is performed after the wetted paper has dried.

7. A method for bridging the joint between two adjacent wall board panels, comprising the steps of:

engaging a pressure-sensitive adhesive on a paper tape with the surfaces of the adjacent wall board panels to connect the tape to the wall board panels to extend over a joint between the two adjacent panels;

burnishing the connected paper tape to the wall board panels;

coating the burnished paper tape with water; and applying a layer of mud over the water coated paper tape, to form a bridge over the joint in which the tape has a consistent surface without raised areas.

* * * * *